US012721788B2

(12) United States Patent
Chen

(10) Patent No.: US 12,721,788 B2
(45) Date of Patent: Sep. 1, 2026

(54) MEDICATION REMINDER DEVICE

(71) Applicant: HAIKOU LILI INVESTMENT CO., LTD., Haikou (CN)

(72) Inventor: Junyuan Chen, Haikou (CN)

(73) Assignee: HAIKOU LILI INVESTMENT CO., LTD., Haikou (CN)

( * ) Notice: Subject to any disclaimer, the term of this patent is extended or adjusted under 35 U.S.C. 154(b) by 0 days.

(21) Appl. No.: 19/078,317

(22) Filed: Mar. 13, 2025

(65) Prior Publication Data

US 2026/0207434 A1 Jul. 23, 2026

(30) Foreign Application Priority Data

Jan. 23, 2025 (CN) ........................ 202520162610.5

(51) Int. Cl.
*A61J 7/04* (2006.01)

(52) U.S. Cl.
CPC ...................................... *A61J 7/04* (2013.01)

(58) Field of Classification Search
CPC ........ B65D 81/366; B65D 51/245; G09F 9/00
USPC .......................................... 116/201, 245, 324
See application file for complete search history.

(56) References Cited

U.S. PATENT DOCUMENTS

2009/0064920 A1* 3/2009 Duer ........................ A61J 7/04 116/324
2014/0007806 A1* 1/2014 Stanton .................... G09F 3/08 116/308

* cited by examiner

*Primary Examiner* — Anthony D Stashick
*Assistant Examiner* — Raven Collins

(57) ABSTRACT

A medication reminder device includes a housing and a push rod. The housing is configured to be attached to a medication container, wherein an observation window is defined in the housing. The push rod is slidably disposed inside the housing. A reminder indicator is arranged on the push rod, and the push rod is configured to slide relative to the housing in response to receiving a force at an end portion of the push rod, to cause the reminder indicator to be exposed through the observation window.

18 Claims, 13 Drawing Sheets

MEDICATION REMINDER DEVICE

CROSS-REFERENCE TO RELATED APPLICATIONS

This application claims priority to Chinese Patent Application No. 202520162610.5, filed with the Chinese Patent Office on Jan. 23, 2025, titled "MEDICATION REMINDER DEVICE", the entire contents of which are incorporated herein by reference.

TECHNICAL FIELD

The present disclosure relates to the technical field of item reminder devices, and in particular, relates to a medication reminder device.

BACKGROUND

For the elderly and other populations experiencing cognitive decline, adherence to medication regimens may be challenging. In cases where multiple medications need to be taken frequently, users often struggle to recall whether a particular dose has been taken, such that the risk of missed or duplicated doses is increased, which may adversely affect their health.

Accordingly, there is an urgent need for a solution that helps effectively record and remind users of their medication administration.

SUMMARY

In view of the above problem, embodiments of the present disclosure provide a medication reminder device, which may be disposed on a medication container and remind a user to take medication by convenient operations.

Some embodiments of the present disclosure provide a medication reminder device. The medication reminder device includes: a housing, configured to be attached to a medication container, wherein an observation window is defined in the housing; and a push rod, slidably disposed inside the housing, wherein a reminder indicator is arranged on the push rod, and the push rod is configured to slide relative to the housing in response to receiving a force at an end portion of the push rod, to cause the reminder indicator to be exposed through the observation window.

In some embodiments, the push rod has a first end and a second end that are opposite to each other, wherein in a case where the reminder indicator is obscured by the housing, the first end protrudes from the housing, and the push rod receives the force via the first end and slides, such that the reminder indicator is exposed through the observation window; and in a case where the reminder indicator is exposed through the observation window, the second end protrudes from the housing, and the push rod receives the force via the second end and slides, such that the reminder indicator is obscured by the housing.

In some embodiments, a first directional indicator is arranged on the first end, and a second directional indicator is arranged on the second end; wherein in a case where the first end protrudes from the housing, the first directional indicator is exposed, and the second directional indicator is positioned inside the housing and obscured by the housing; and in a case where the second end protrudes from the housing, the second directional indicator is exposed, and the first directional indicator is positioned inside the housing and obscured by the housing.

In some embodiments, a plurality of different reminder indicators are arrayed on the push rod; wherein one of the reminder indicators is exposed through the observation window in a case where the push rod slides to different positions relative to the housing.

In some embodiments, the housing includes a first housing and a second housing; wherein a first notch is defined in an edge of the first housing, and a second notch is defined in an edge of the second housing; wherein the first housing is snap-fitted to the second housing, and the first notch and the second notch together define an opening allowing the push rod to slide (extend and retract) thereinside.

In some embodiments, a first engagement portion is arranged on the push rod, and at least two second engagement portions are arranged inside the housing; wherein the first engagement portion is configured to be engaged with one of the second engagement portions in a case where the reminder indicator is obscured by the housing, and the first engagement portion is further configured to be engaged with another of the two second engagement portions in a case where the reminder indicator is exposed from the observation window.

In some embodiments, the first engagement portion includes an elastic protrusion, and each of the second engagement portions includes a slot; wherein the elastic protrusion is configured to elastically contract in response to compression by an inner wall of the housing in a case where the push rod slides, and is configured to be automatically rebound into engagement with the slot in a case where the push rod slides to a designated position.

In some embodiments, the push rod is in a first position in a case where the reminder indicator is obscured by the housing, and the push rod is in a second position in a case where the reminder indicator is exposed through the observation window; and a limiting protrusion is arranged on the push rod; wherein the limiting protrusion is configured to be abutted against an inner wall of a first side of the housing to prevent the push rod from further sliding in a case where the push rod slides from the first position to the second position, and the limiting protrusion is further configured to be abutted against an inner wall of a second side of the housing to prevent the push rod from further sliding in a case where the push rod slides from the second position to the first position.

In some embodiments, a plurality of push rods are arrayed on the housing.

In some embodiments, a side of the housing is configured to be adhesively attached to the medication container; or a lanyard is arranged on the housing, wherein the lanyard is configured to be attached to the medication container.

In the medication reminder device according to the embodiments of the present disclosure, by attaching the housing to the medication container, a relationship is established between the medication reminder device and the corresponding medication. As such, the medication reminder device is capable of making recording and reminding on whether the corresponding medication has been taken. By sliding the push rod to expose or conceal the reminder indicator from the housing, the method allows for convenient operation while recording and reminding the user of medication administration. Furthermore, this ensures that an overall thickness of the medication reminder device remains small, and thus it is easy to store and place the medication reminder device when being installed on the medication container.

The above description only summarizes the technical solutions of the present disclosure. Specific embodiments of the present disclosure are described hereinafter to better and clearer understand the technical solutions of the present disclosure, to practice the technical solutions based on the disclosure of the specification, and to make the above and other objectives, features and advantages of the present disclosure more apparent and understandable.

BRIEF DESCRIPTION OF THE DRAWINGS

By reading the detailed description of preferred embodiments hereinafter, various other advantages and beneficial effects become clear and apparent for persons of ordinary skill in the art. The accompanying drawings are merely for illustrating the preferred embodiments, but shall not be construed as limiting the present disclosure. In all the accompanying drawings, like reference numerals denote like parts. In the drawings.

Figure 1:
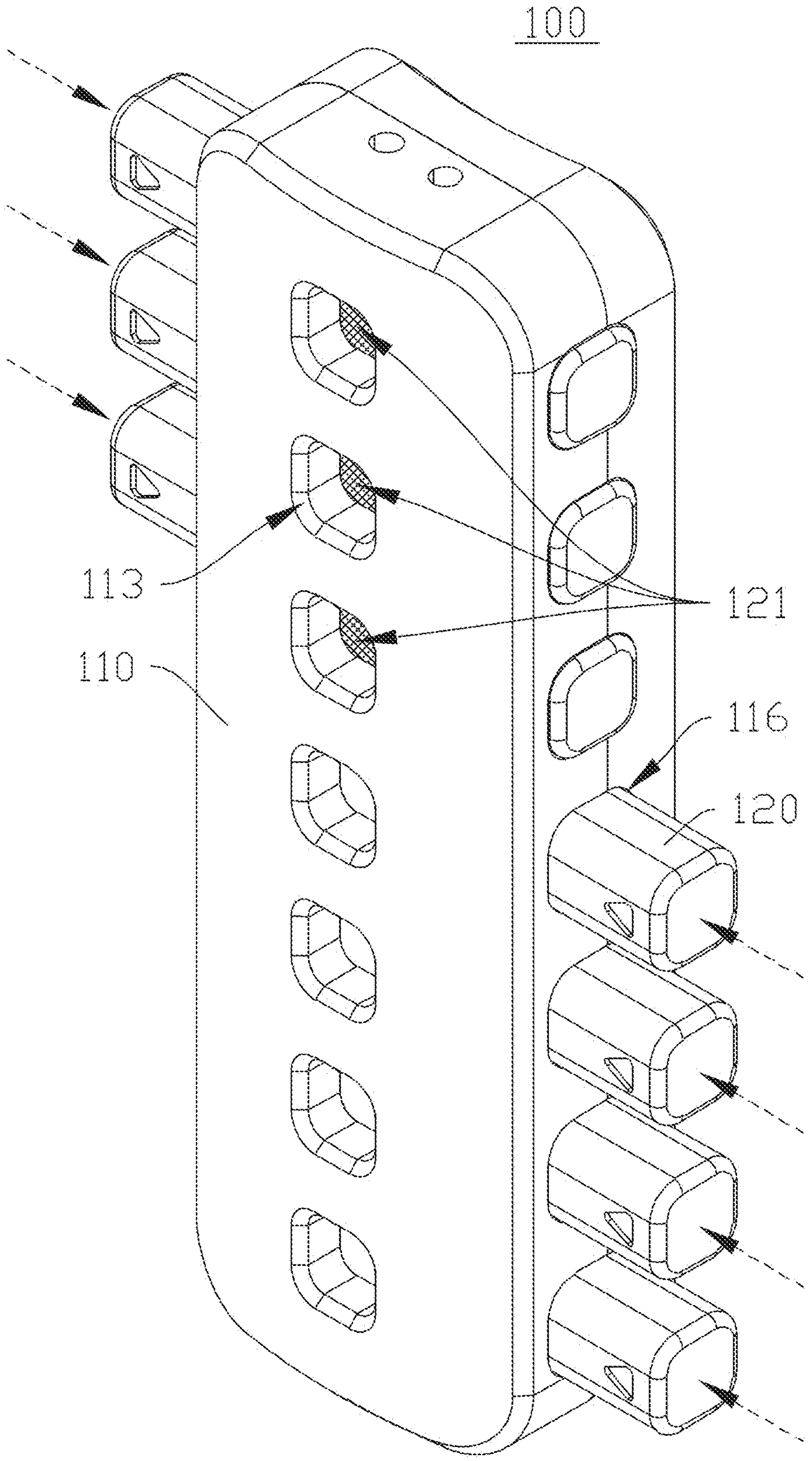
FIG. 1 is a three-dimensional view of a medication reminder device according to some embodiments of the present disclosure.

Reference numerals in the embodiments and denotations thereof:

100—medication reminder device;

110—housing; 111—adhesive layer; 112—lanyard; 113—observation window; 114—first housing; 1141—first notch; 115—second housing; 1151—second notch; 116—opening; 117—second engagement portion; 1171—slot; 118—aperture;

120—push rod; 121—reminder indicator; 122—first end; 123—second end; 124—first directional indicator; 125—second directional indicator; 126—first engagement portion; 1261—elastic protrusion; 1261*a*—shell; 1261*b*—telescopic marble; 1261*c*—elastic member; 127—limiting protrusion;

130—blank indicator; and

200—medication container.

DETAILED DESCRIPTION

The embodiments containing the technical solutions of the present disclosure are described in detail with reference to the accompanying drawings. The embodiments hereinafter are only used to clearly describe the technical solutions of the present disclosure. Therefore, these embodiments are only used as examples, but are not intended to limit the protection scope of the present disclosure.

Unless defined otherwise, all technical and scientific terms used herein have the same meaning as commonly understood by one of ordinary skill in the art to which the present disclosure pertains. The terms used herein in the specification of present disclosure are only intended to illustrate the specific embodiments of the present disclosure, instead of limiting the present disclosure. The terms "comprise," "include," and any variations thereof in the specification, claims, and the description of the drawings of the present disclosure are intended to cover a non-exclusive inclusion.

In the description of the present disclosure, the terms "first," "second," and the like are only used for distinguishing different objects, but shall not be understood as indication or implication of relative importance or implicit indication of the number of the specific technical features, the specific sequence or priorities. In the description of the embodiments of the present disclosure, the term "multiple" or "a plurality of" signifies at least two, unless otherwise specified.

The terms "example" and "embodiment" in this specification signify that the specific characteristic, structures or features described with reference to the embodiments may be covered in at least one embodiment of the present disclosure. This term, when appearing in various parts of the specification, neither indicates the same embodiment, nor indicates an independent or optional embodiment that is exclusive of the other embodiments. A person skilled in the art would implicitly or explicitly understand that the embodiments described in this specification may be incorporated with other embodiments.

In the description of the embodiments of the present disclosure, the term "and/or" is merely an association relationship for describing associated objects, which represents that there may exist three types of relationships. For example, the phrase "A and/or B" may indicate (A), (B), or (A and B). In addition, the forward-slash symbol "/" generally represents an "or" relationship between associated objects before and after the symbol.

In the description of the embodiments of the present disclosure, the term "multiple" or "a plurality of" signifies more than two (including two), unless otherwise specified. Likewise, the term "a plurality of groups" or "multiple groups" signifies more than two groups (including two groups), and the term "a plurality of pieces" or "multiple pieces" signifies more than two pieces (including two pieces).

In the description of the embodiments of the present disclosure, it should be understood that the terms "central," "transversal," "longitudinal," "length," "width," "thickness," "upper," "lower," "front," "rear," "left," "right," "vertical," "horizontal," "top," "bottom," "inner," "outer," "clockwise," "counterclockwise," "axial," "radial," "circumferential," and the like indicate orientations and position relationships which are based on the illustrations in the accompanying drawings, and these terms are merely for ease and brevity of the description, instead of indicating or implying that the devices or elements shall have a particular orientation and shall be structured and operated based on the particular orientation. Accordingly, these terms shall not be construed as limiting the present disclosure.

In the description of the embodiments of the present disclosure, it should be noted that unless otherwise specified and defined, the terms "mounted," "coupled," "connected," "secured," and derivative forms thereof shall be understood in a broad sense, which, for example, may be understood as secured connection, detachable connection or integral connection; may be understood as mechanical connection or electrical connection, or understood as direct connection, indirect connection via an intermediate medium, or communication between the interiors of two elements or interactions between two elements. Persons of ordinary skill in the art may understand the specific meanings of the above terms in the embodiments of the present disclosure according to the actual circumstances and contexts.

Figure 2:
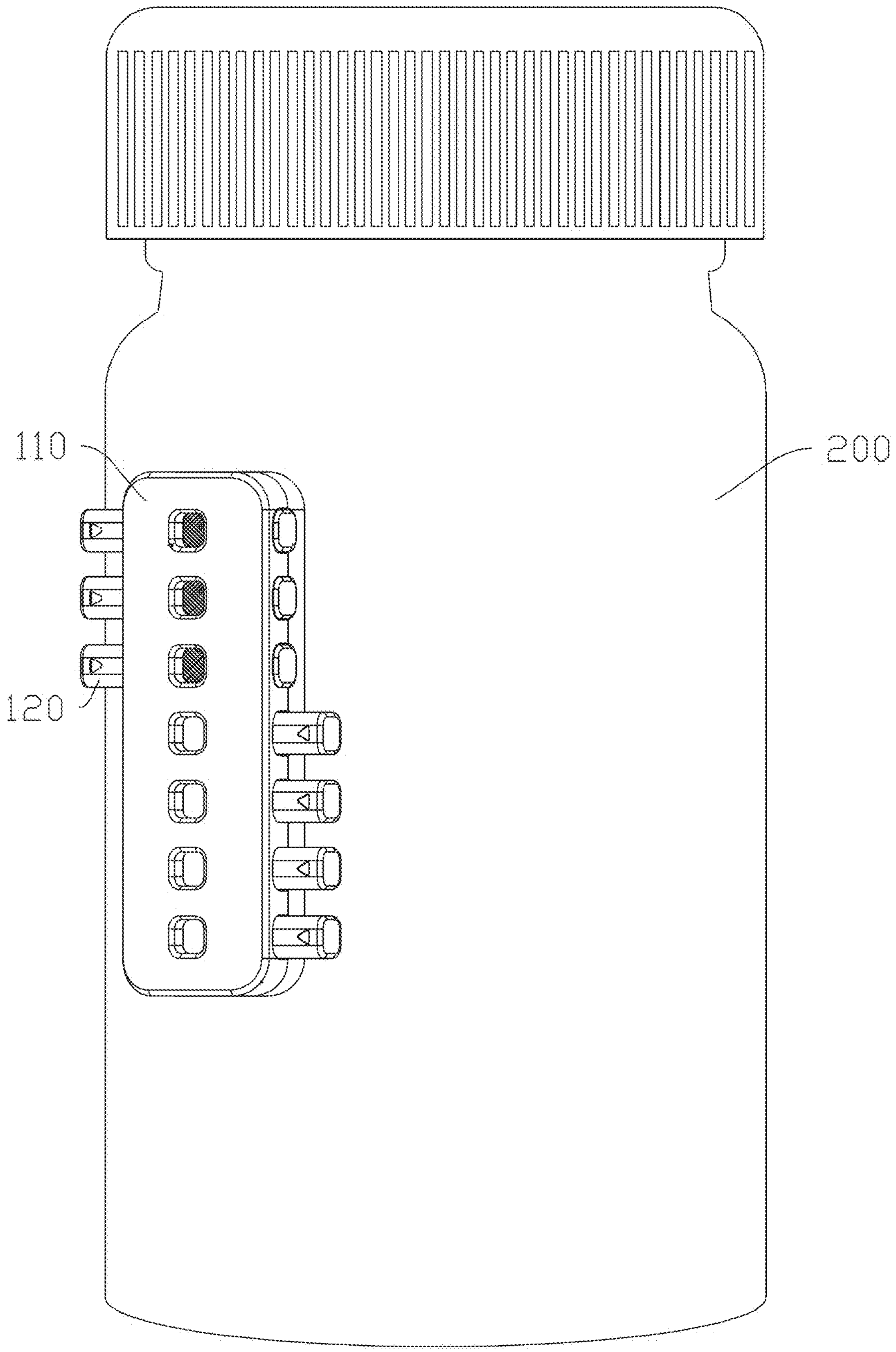
FIG. 2 is a three-dimensional view of a medication reminder device which is adhesively attached to a medication container according to some embodiments of the present disclosure.
Figure 3:
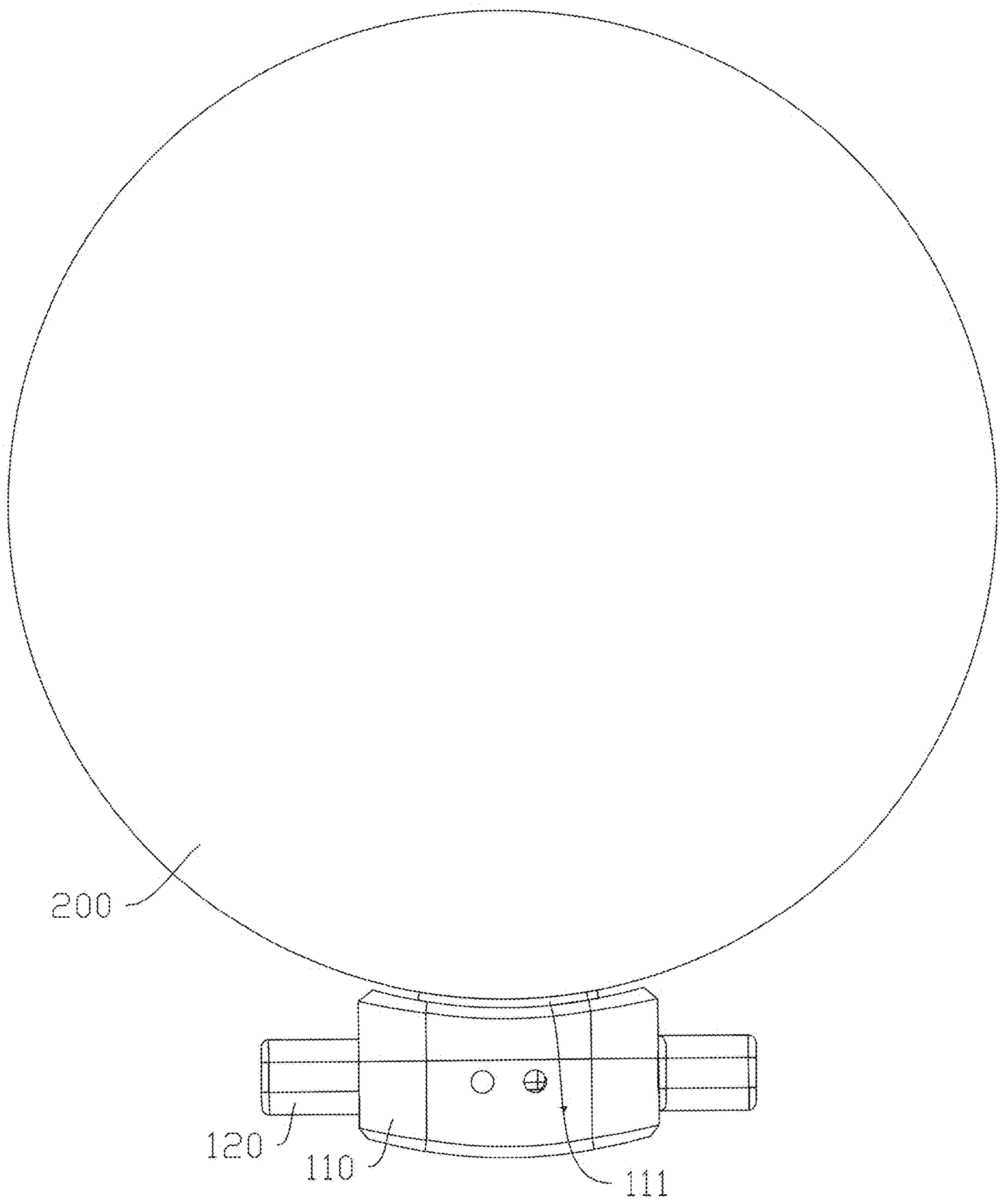
FIG. 3 is a top view of a medication reminder device adhesively attached to a medication container according to some embodiments of the present disclosure.
Figure 4:
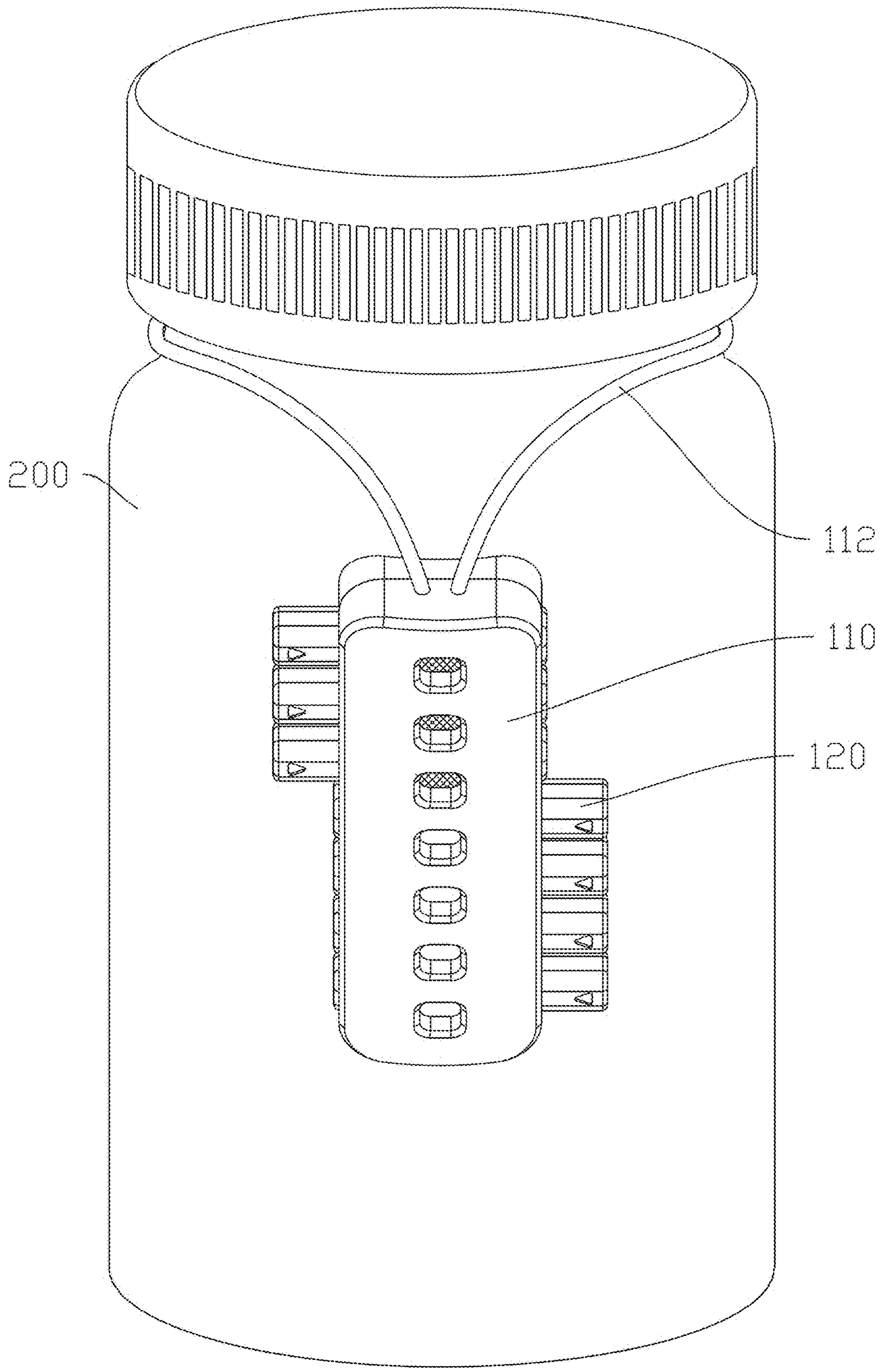
FIG. 4 is a three-dimensional view of a medication reminder device hung on a medication container according to some embodiments of the present disclosure.

For convenience of user's operations and for reminder of medication administration for a user, some embodiments of the present disclosure provide a medication reminder device. Specifically, referring to FIG. 1, a three-dimensional structure of a medication reminder device 100 is illustrated. As illustrated in FIG. 1, the medication reminder device 100 includes a housing 110 and a push rod 120. The housing 110 is configured to be attached to a medication container. Some embodiments of the present disclosure further provide a medication container. Specifically, as illustrated in FIG. 2 and FIG. 3, a side of the housing 110 may be attached to the medication container 200 by an adhesive layer 111. In addition, in a case where the medication container 200 is a most commonly used medication bottle as illustrated in the drawings, the side of the housing 110 attached to the medication bottle may be designed to a curved surface that matches a curvature of a side of the medication bottle. This allows the housing 110 to better conform to the medication bottle and be securely attached. In addition to adhesive attachment, the medication reminder device 100 may also be secured to the medication bottle 200 by a hanging method. Specifically, as illustrated in FIG. 4, a lanyard 112 is arranged on the housing 110. The lanyard 112 is hung on the medication container 200. For example, the lanyard 112 may be hung at a neck of the medication bottle, as illustrated in FIG. 4, such that the medication reminder device 100 is attached to the medication container 200. With respect to a disposable medication container 200, in a case where medication in the medication container 200 is all taken (used up), the lanyard 112 is removed from the medication container 200, and thus the medication reminder device 100 is separated from the medication container 200. Further, the medication reminder device 100 may be further hung on a new medication container 200 for repeated use.

Still referring to FIG. 1, an observation window 113 is defined in the housing 110, the push rod 120 may be disposed inside the housing 110, and a reminder indicator 121 is arranged on the push rod 120. The reminder indicator 121 may be formed by methods such as defining a slot or protrusion, arranging a sticker, printing, spraying, or the other techniques on the push rod 120. The push rod 120 is configured to slide relative to the housing 110 in response to receiving a force at an end portion thereof, to cause the reminder indicator 121 to be exposed through the observation window 113.

Considering that most medication needs to be taken periodically, for example, one dose per day for a week, or three doses per day. Accordingly, for continuous medication reminders within a week, in the specific embodiments as illustrated in the drawings, seven push rods 120 are arrayed on the housing 110. Each of the push rods 120 may be configured to record medication administration for one day, and the seven push rods 120 together record medication administration for a whole week. For first use, all the push rods 120 are pushed to a state such that the reminder indicators 121 are exposed from the housing 110 (the states of three push rods 120 as illustrated in FIG. 1). In a case where a user sees a first reminder indicator 121 (which may be a reminder indicator 121 at the top or may be a reminder indicator 121 at the bottom depending on use preference of the user) through the observation window 113, the dose for the day is not taken, and the users may take the dose under the reminder. Upon administration, the users may push a first push rod 120 to cause the first reminder indicator 121 to move to a state of being obscured by the housing 110, which indicates that the dose for the day is taken. In a case where the user forgets whether the dose for the day has been taken, the user may make a confirmation by checking whether a corresponding reminder indicator 121 is observable. The operations are repeated for the subsequent days within the administration course until doses for the whole week are all taken. Where dose administration for a next week is required, all the push rods 120 may be reset for reminders for the next week.

The reminder indicator 121 may also be used to indicate that the medication has been taken. Accordingly, during the first use, all push rods 120 are pushed to a state where the reminder indicator 121 is obscured. Upon medication administration each day, the corresponding push rod 120 is pushed to a state where the reminder indicator 121 is exposed. In a case where the user forgets whether the medication has been taken on a given day, the user may make a confirmation by checking whether the corresponding reminder indicator 121 is observable or visible. In a case where the reminder indicator 121 is observable or visible, it indicates that the medication has been taken; and in a case where the reminder indicator 121 is not observable or visible, it indicates that the medication has not been taken.

The configuration of seven push rods 120 described above is merely an example. In some other embodiments, three push rods 120 may be configured, allowing for the recording and reminding of three daily medication intakes. This means that one day is a reminder cycle of the three push rods 120. Alternatively, depending on other medication regimens, one or another quantity of push rods 120 may be configured, which is not limited herein.

Figure 5A:
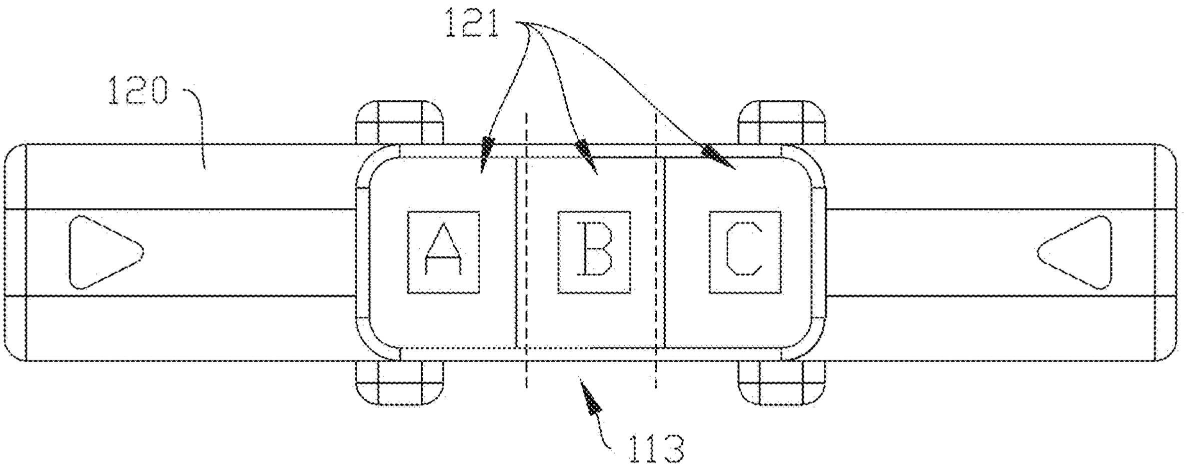
FIG. 5A is a plan view of a plurality of reminder indicator arranged on a push rod of a medication reminder device according to some embodiments of the present disclosure.

Further, a single push rod 120 may be moved to different positions to indicate three daily medication intakes. Specifically, as illustrated in FIG. 5A, multiple distinct reminder indicators 121 may be arranged on the push rod 120. In the drawings, the reminder indicators 121 are represented as reminder indicator A, reminder indicator B, and reminder indicator C. In actual products, these indicators may also be distinguished by color, pattern, text, or other forms, which is not limited herein. In FIG. 5A, an area between two dashed lines represents an observation window 113. In the illustrated state, reminder indicator B is observable within the observation window, while reminder indicators A and C are obscured by the housing and are invisible. In a case where the push rod 120 is slid to different positions, only one of the reminder indicators 121 may be exposed through the observation window at a time, thereby providing a reminder for medication intake at different times of the day. For example, in a scenario where medication needs to be taken in the morning, noon, and evening, the push rod 120 is first slid to expose reminder indicator A, which signifies that the morning dose has not yet been taken. After taking the morning dose as indicated by reminder indicator A, the user slides the push rod 120 to the left by a specific distance to cause reminder indicator A to be obscured and reminder indicator B to be exposed, indicating that the noon dose has not yet been taken. At noon, the user takes the medication as prompted by reminder indicator B, then slides the push rod 120 further left until reminder indicator C is exposed. In the evening, the user follows reminder indicator C to take the final dose of the day. Upon completion of the evening dose, the push rod 120 is slid back to the right until reminder indicator A is exposed again, such that a reminder is set for medication administration for a next morning. This process is then repeated daily.

Figure 5B:
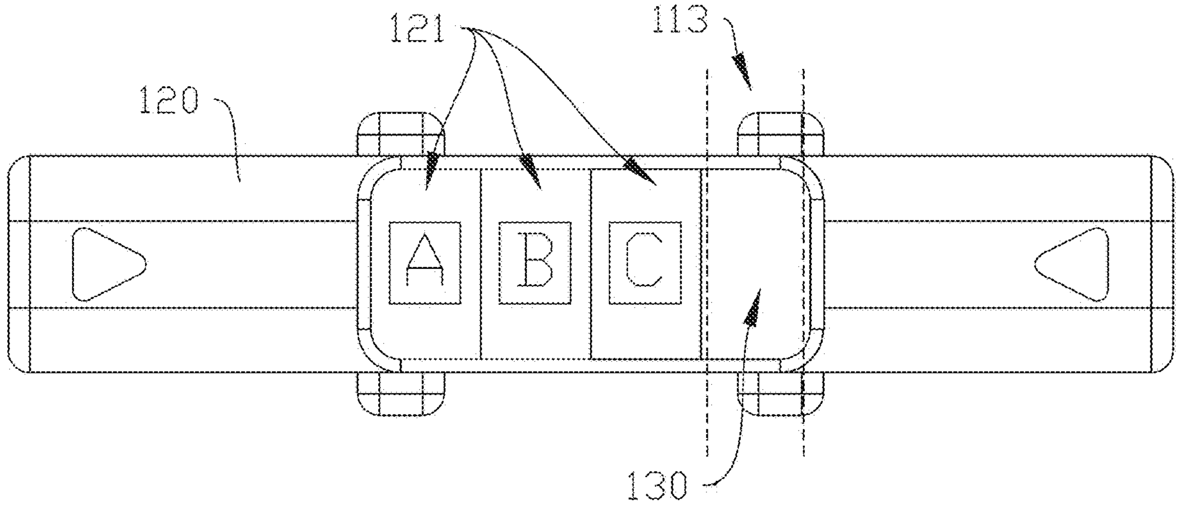
FIG. 5B is a plan view of a plurality of reminder indicator and a blank indicator arranged on a push rod of a medication reminder device according to some embodiments of the present disclosure.

In addition, to enhance user experience, in a case where medication is taken three times daily over the course of a week, a plurality of push rods 120 may be configured simultaneously. As illustrated in FIG. 5B, each of the push rods 120 is arranged with reminder indicators A, B, and C, as well as a blank indicator 130. Each of the push rods 120 corresponds to a specific day, and each reminder indicator 121 corresponds to a single dose. The operation is generally the same as that described for FIG. 5A, except that upon completion of the evening dose, the corresponding push rod 120 is slid to a state (the state as illustrated in FIG. 5A) where the blank indicator 130 is exposed through the observation window 113 as represented by the dashed lines, to indicate that medication administration for that day has been completed. The reminder indicators 121 on a next push rod 120 may then be used to provide reminders for medication administration for a following day.

In the above embodiments, the quantity of push rods 120 and the quantity of reminder indicators 121 on each push rod 120 are provided as illustrative examples. In other implementations, these quantities may be adjusted as needed based on specific medication regimens, which is not limited herein.

In the medication reminder device 100 according to the embodiments of the present disclosure, by attaching the housing 110 to the medication container 200, a relationship is established between the medication reminder device 100 and the corresponding medication. As such, the medication reminder device 100 is capable of making recording and reminding on whether the corresponding medication has been taken. By sliding the push rod 120 to expose or conceal the reminder indicator 121 from the housing 110, the method allows for convenient operation while recording and reminding the user of medication administration. Furthermore, this ensures that an overall thickness of the medication reminder device 100 remains small, and thus it is easy to store and place the medication reminder device 100 when being installed on the medication container 200.

Figure 6:
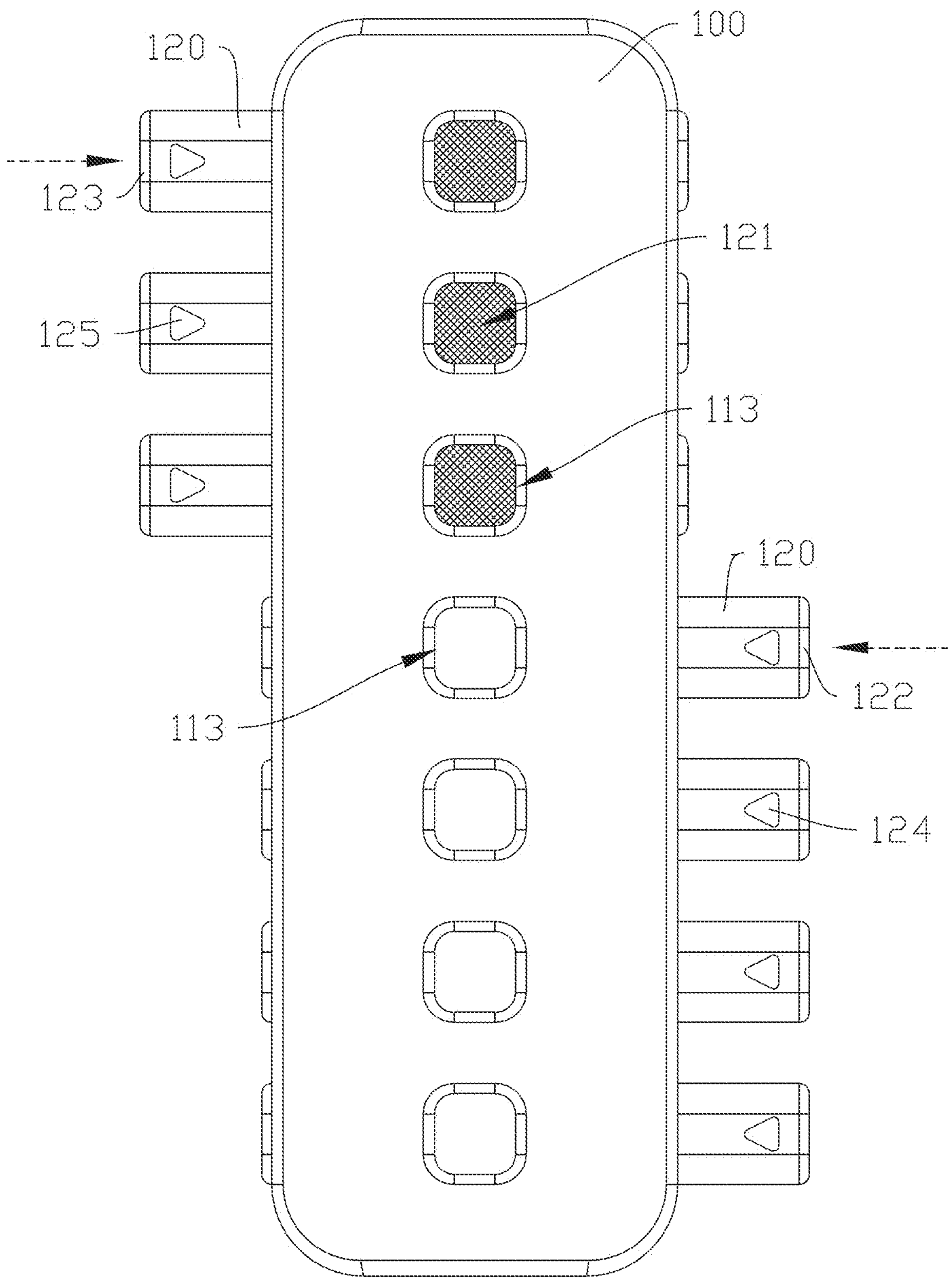
FIG. 6 is a front view of a medication reminder device according to some embodiments of the present disclosure.

To facilitate easy sliding of the push rod 120 during operation, as illustrated in a front view structure of the medication reminder device 100 in FIG. 6, the push rod 120 may have a first end 122 and a second end 123 that are opposite to each other. As illustrated in the lower four push rods 120 in FIG. 6, in a case where the reminder indicator 121 is obscured by the housing 110, the push rod 120 may be slid by applying a force to the first end 122. A direction of the applied force and a sliding direction are indicated by the dashed arrow on a right side of the fourth push rod 120. This means that the user may easily push the push rod 120 from the protruding first end 122, such that the reminder indicator 121 is exposed through the observation window 113.

As illustrated in the upper three push rods 120 in FIG. 6, in a case where the reminder indicator 121 is exposed through the observation window 113, the second end 123 protrudes from the housing 110. The push rod 120 may be slid by applying a force to the second end 123. A direction of the applied force and a sliding direction are indicated by the dashed arrow on a left side of a top push rod 120. This means that the user may easily push the push rod 120 from the protruding second end 123, such that the reminder indicator 121 on the push rod 120 is obscured by the housing 110.

Furthermore, for groups such as the elderly, who may need to take medication frequently, complex operations may be difficult to understand and use. To address this issue, and to make it easier for the user to learn how to operate and use the medication reminder device 100, as illustrated in FIG. 6, a first directional indicator 124 is arranged on the first end 122, and a second directional indicator 125 is arranged on the second end 123. Specifically, the first directional indicator 124 and the second directional indicator 125 may be arrow shapes, as illustrated in the drawings, or these indicators may be arrows of other shapes. These indicators are intended to guide the user on the direction in which to push. Similar to the reminder indicator 121, the first directional indicator 124 and the second directional indicator 125 may be formed by methods such as defining a slot or protrusion, arranging a sticker, printing, spraying, or the other techniques on the push rod 120, as long as the user can observe and identify the correct direction of operation.

As illustrated in the lower four push rods 120 in FIG. 6, when the first end 122 protrudes from the housing 110, the first directional indicator 124 is exposed, signaling to the user from which direction to push the corresponding push rod 120. The second directional indicator 125, however, is disposed inside the housing 110 and is obscured by the housing 110, to prevent misleading the user.

As illustrated in the upper three push rods 120 in FIG. 6, in a case where the second end 123 protrudes from the housing 110, the second directional indicator 125 is exposed, guiding the user on the direction to push. The first directional indicator 124, however, is disposed inside the housing 110 and is obscured by the housing 110, to prevent any confusion for the user.

Figure 7A:
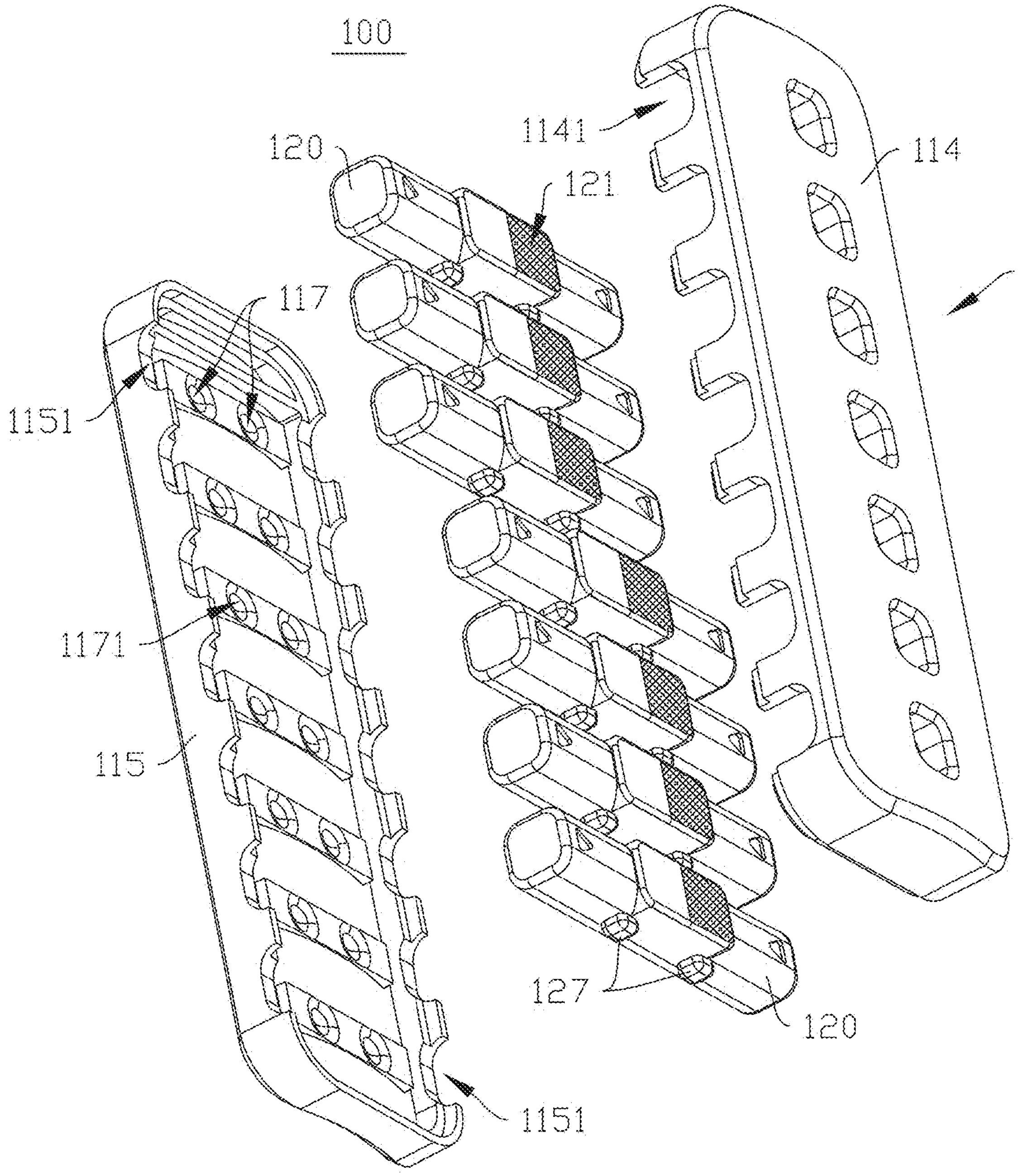
FIG. 7A is an exploded view from one perspective of medication reminder device according to some embodiments of the present disclosure.

Referring to FIG. 7A, an exploded view of the medication reminder device 100 is illustrated. In some embodiments, the housing 110 includes a first housing 114 and a second housing 115. A first notch 1141 is defined in an edge of the first housing 114, and a second notch 1151 is defined in the edge of the second housing 115. The first housing 114 is snap-fitted to the second housing 115 (connected by snap-fit engagement), and in this case, the first notch 1141 and the second notch 1151 together define an opening allowing the push rod 120 to slide (e.g. extend and retract) thereinside (as illustrated in FIG. 1).

Figure 7B:
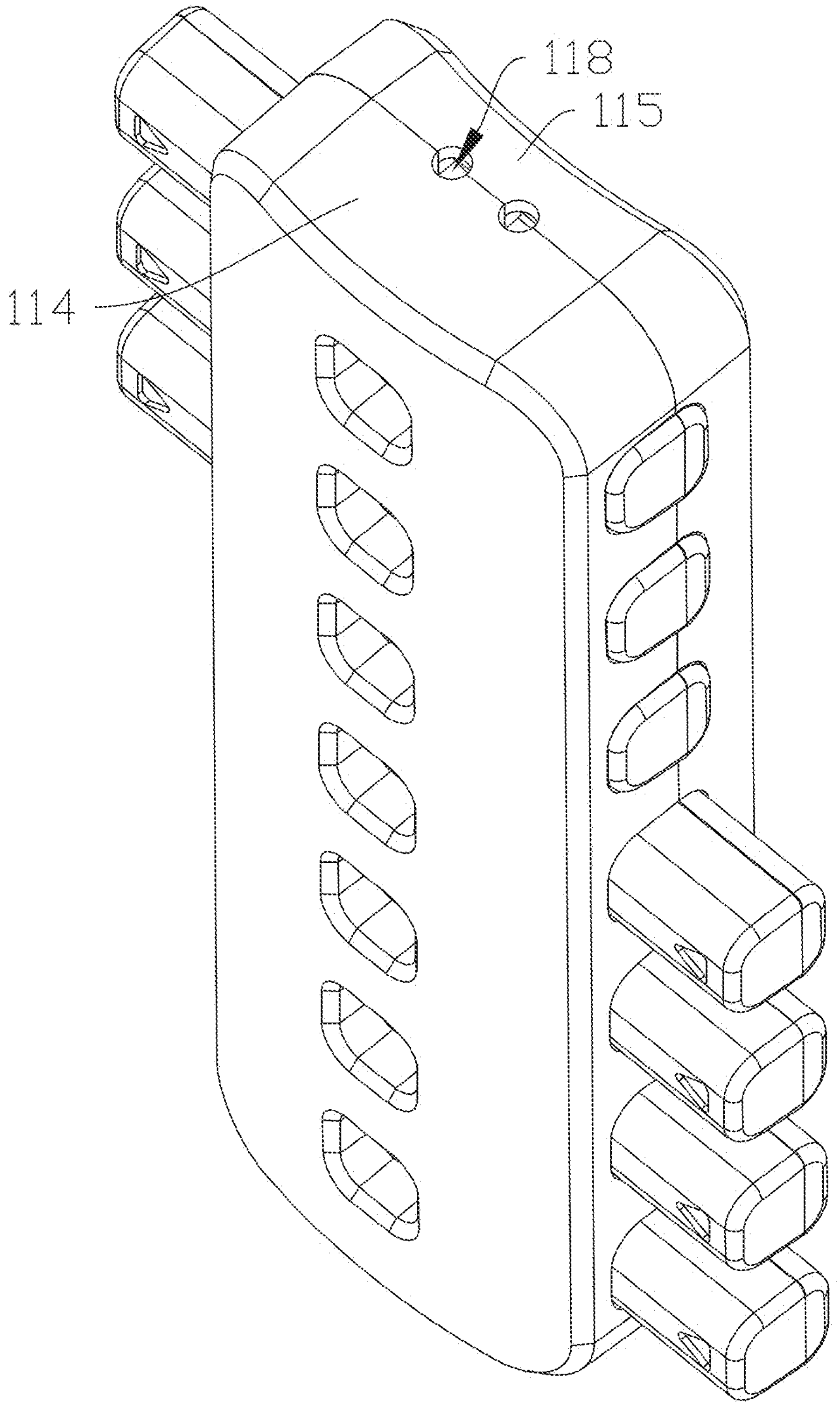
FIG. 7B is a three-dimensional view of a medication reminder device according to some embodiments of the present disclosure.

By arranging the push rod 120 between the first housing 114 and the second housing 115 and then snap-fitting the first housing 114 to the second housing 115, the assembly of the medication reminder device 100 may be completed quickly and efficiently. Furthermore, the first housing 114 and the second housing 115 may be assembled and secured by ultrasonic welding. Compared to snap-fit connections, ultrasonic welding eliminates the need for snap-fit mechanisms, which makes the assembled medication reminder device 100 more compact. In addition, ultrasonic welding ensures the structural stability and reliability of the housing 110. On this basis, referring to FIG. 7B, the aperture 118 on the housing 110 for attaching the lanyard 112 may be formed by a notch on the first housing 114 being paired with a notch on the second housing 115 to allow the lanyard 112 to be easily fitted into the aperture 118 in the process of snapping the first housing 114 to the second housing 115.

Figure 8:
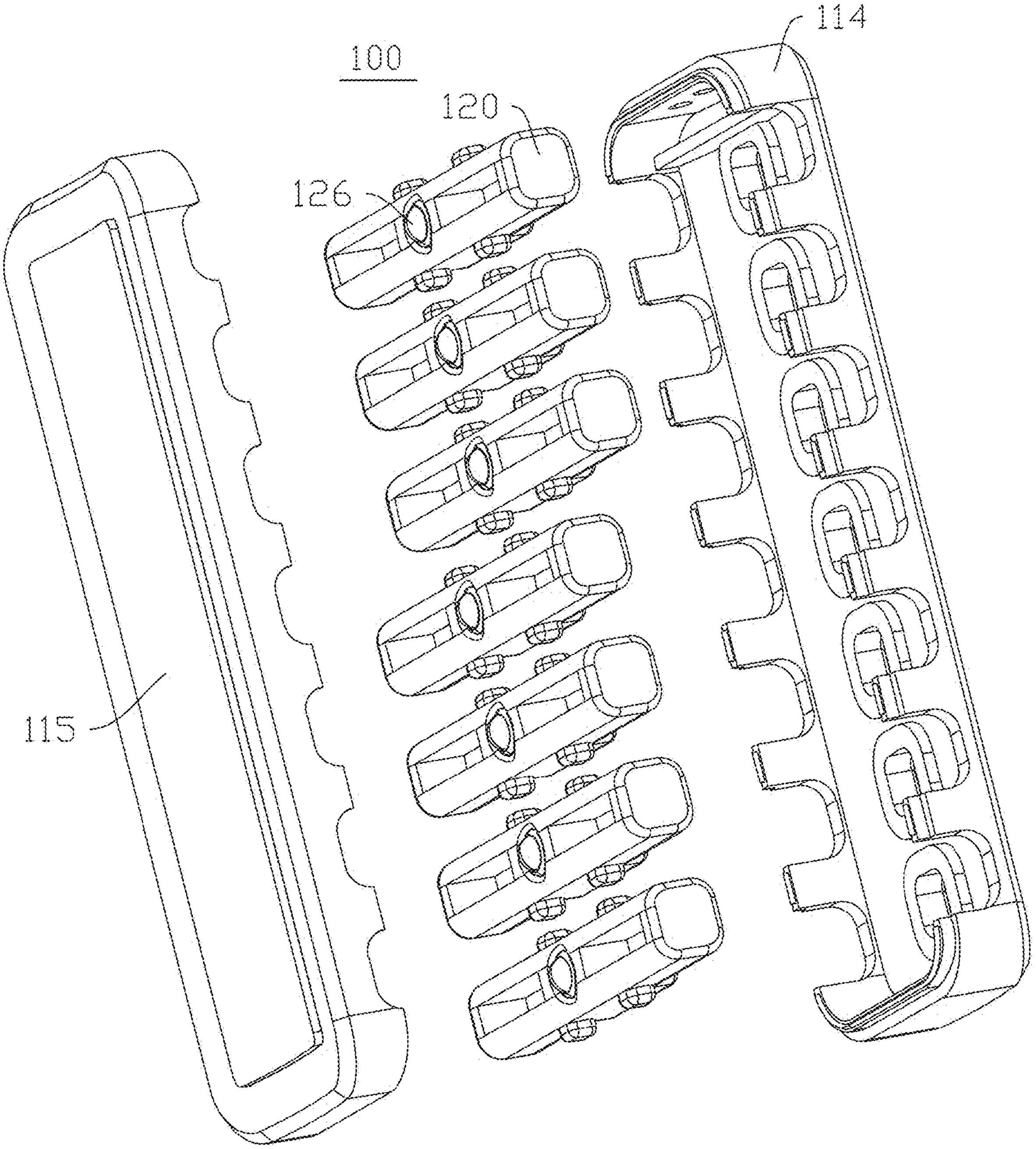
FIG. 8 is an exploded view from another perspective of medication reminder device according to some embodiments of the present disclosure.

To prevent the push rod 120 from being inadvertently pushed which leads to incorrect medication reminders, as illustrated in FIG. 7A and an exploded structure from another perspective in FIG. 8, a first engagement portion 126 may be arranged on the push rod 120, and at least two second engagement portions 117 may be arranged inside the housing 110. As illustrated in a cross-sectional structure in FIG. 9, in a case where the reminder indicator 121 is obscured by the housing 110, the first engagement portion 126 is engaged with one of the second engagement portions 117 (the second engagement portion 117 on a right side in FIG. 9), to prevent the push rod 120 from being mistakenly touched and sliding. As illustrated in a cross-sectional structure in FIG. 10, in a case where the reminder indicator 121 is exposed through the observation window 113, the first engagement portion 126 is engaged with the other of the second engagement portions 117 (the second locking portion 117 on a left side in FIG. 10), to likewise prevent the push rod 120 from being inadvertently touched and sliding. In a case where a plurality of reminder indicators 121 are arranged on the push rod 120, as illustrated in FIG. 5A and FIG. 5B, an appropriate quantity of second locking portions 117 may be arranged for engagement and limiting for each of the exposed reminder indicators 121.

Figure 10:
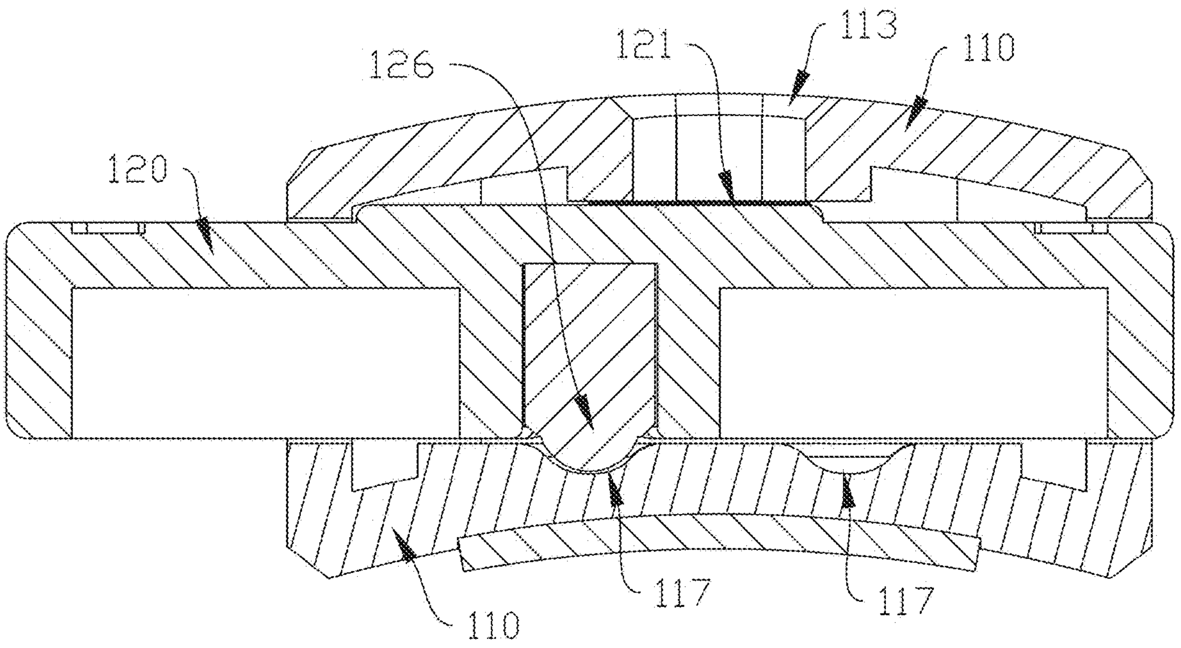
FIG. 10 is a sectional view of a reminder indicator in a visible state in a medication reminder device according to some embodiments of the present disclosure.
Figure 11A:
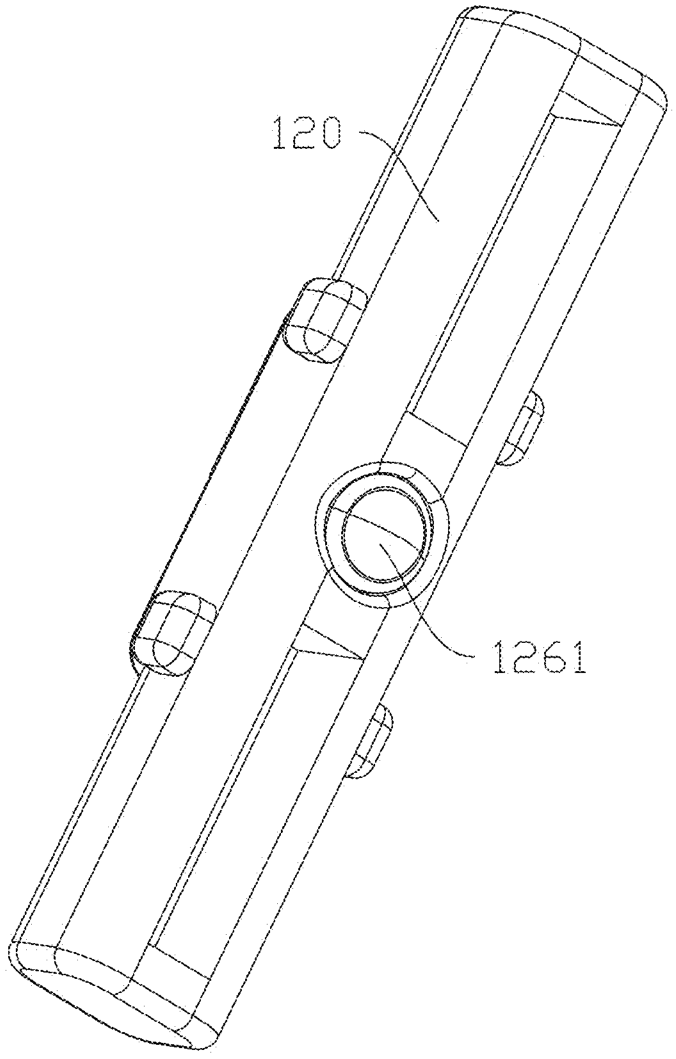
FIG. 11A is a three-dimensional view of a push rod in a medication reminder device according to some embodiments of the present disclosure.

Specifically, the first engagement portion 126 includes an elastic protrusion 1261 as illustrated in FIG. 11A, such as an elastic plunger, and the second engagement portion includes a engagement slot 1171 as illustrated in FIG. 7A. In a case where the push rod 120 switches between the states illustrated in FIG. 9 and FIG. 10, the elastic protrusion 1261 is compressed by an inner wall of the housing 110 and elastically contracts, to ensure that the movement of the push rod 120 is smooth and requires minimal effort. In a case where the push rod 120 reaches the state illustrated in FIG. 9 or FIG. 10, the elastic protrusion 1261 is no longer compressed by the inner wall of the housing 110, such that the elastic protrusion 1261 automatically pops up and is engaged with the engagement slot 1171, to limit the push rod 120 in its current position. Furthermore, in a case where the push rod 120 reaches the state illustrated in FIG. 9 or FIG. 10, the elastic protrusion 1261 automatically pops up and collides with an inner wall of the engagement slot 1171, producing a "click" sound. This not only provides the user with feedback that the push rod has reached its correct position, but also enhances a tactile feel when the user pushes the push rod 120, thereby improving the overall user experience.

Figure 9:
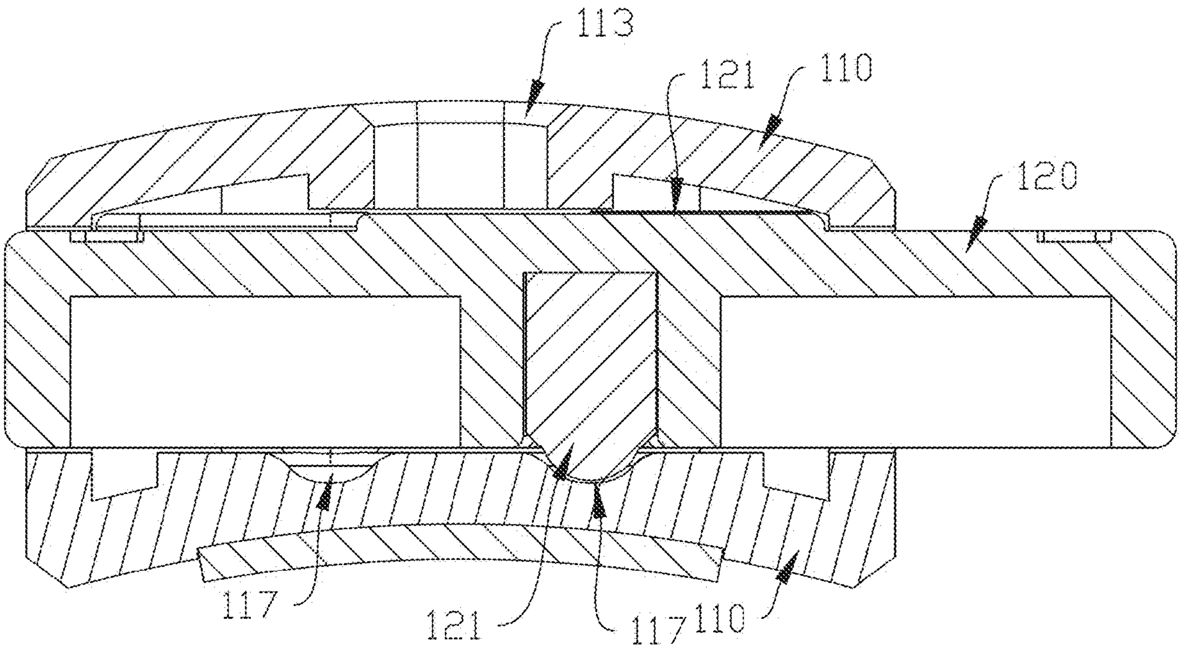
FIG. 9 is a sectional view of a reminder indicator in a concealed state in a medication reminder device according to some embodiments of the present disclosure.
Figure 11B:
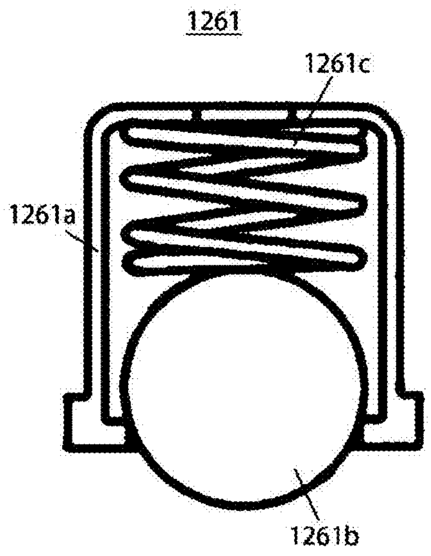
FIG. 11B is a sectional view of an elastic protrusion in a medication reminder device according to some embodiments of the present disclosure.

Specifically, referring to FIG. 11B, the elastic protrusion 1261 may include a shell 1261*a*, a telescopic marble 1261*b*, and an elastic member 1261*c*, and the shell 1261*a* is inserted and fixed to the push rod 120, and the telescopic marble 1261*b* elastically shrinks when it is squeezed by the inner wall of the housing 110, and the telescopic marble 1261*b* automatically pops outward and snaps into the slot 1171 under the elastic force of the elastic member 1261*c* when it is not squeezed by the inner wall of the housing 110. The telescopic marble 1261*b* will automatically pop outwardly under the action of the elastic force and snap into contact with the slot 1171. Further, the retractable marble 1261*b* may be made of stainless steel to provide a better feel. In a case where the reminder indicator 121 is obscured by the housing 110 to a state as illustrated in FIG. 9, the state is defined as a first position of the push rod 120. In a case where the reminder indicator 121 is exposed through the observation window 113 to a state as illustrated in FIG. 10, the state is defined as a second position of the push rod 120. Referring to FIG. 7A and FIG. 8 again, in order to prevent the push rod 120 from sliding out of the housing 110, a limiting protrusion 127 is arranged on the push rod 120. In a case where the push rod 120 slides from the first position to the second position (i.e., when the push rod 120 slides leftward from a position illustrated in FIG. 12 to a position illustrated in FIG. 13), the limiting protrusion 127 is abutted against a left inner wall of the housing 110, to limit further sliding of the push rod 120. Similarly, in a case where the push rod 120 slides from the second position to the first position (i.e., when the push rod 120 slides rightward from the position illustrated in FIG. 13 to the position illustrated in FIG. 12), the limiting protrusion 127 is abutted against a right inner wall of the housing 110, to limit further sliding of the push rod 120. In summary, the limiting protrusion 127 is abutted against the inner walls of the housing 110 on both sides, such that the push rod 120 is prevented from sliding out from the housing 110 during sliding.

Figure 12:
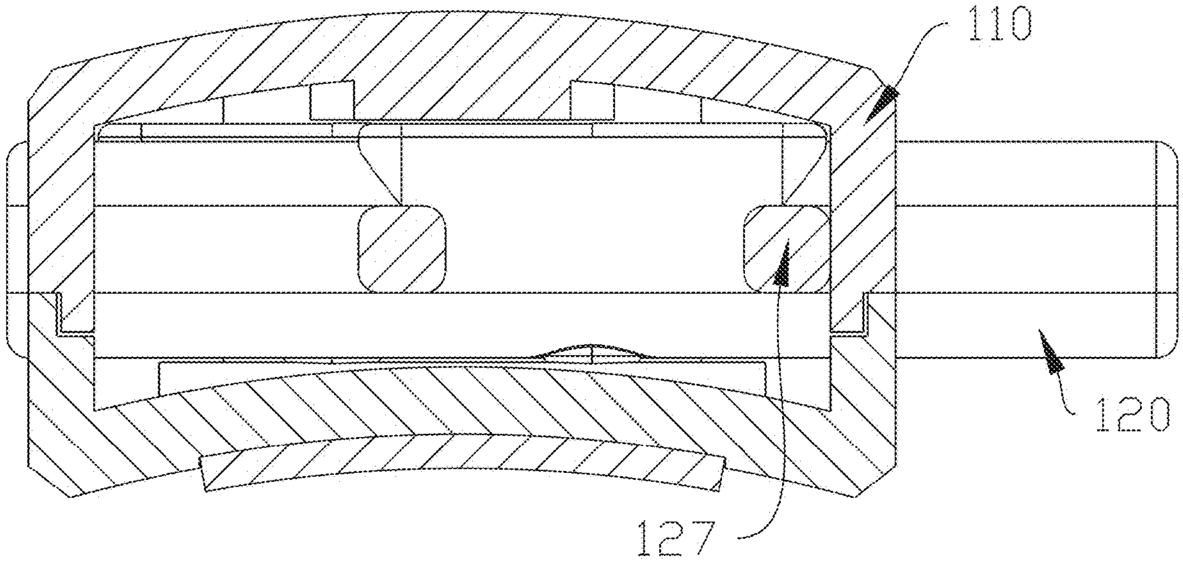
FIG. 12 is a sectional view of a push rod in a first position in a medication reminder device according to some embodiments of the present disclosure.
Figure 13:
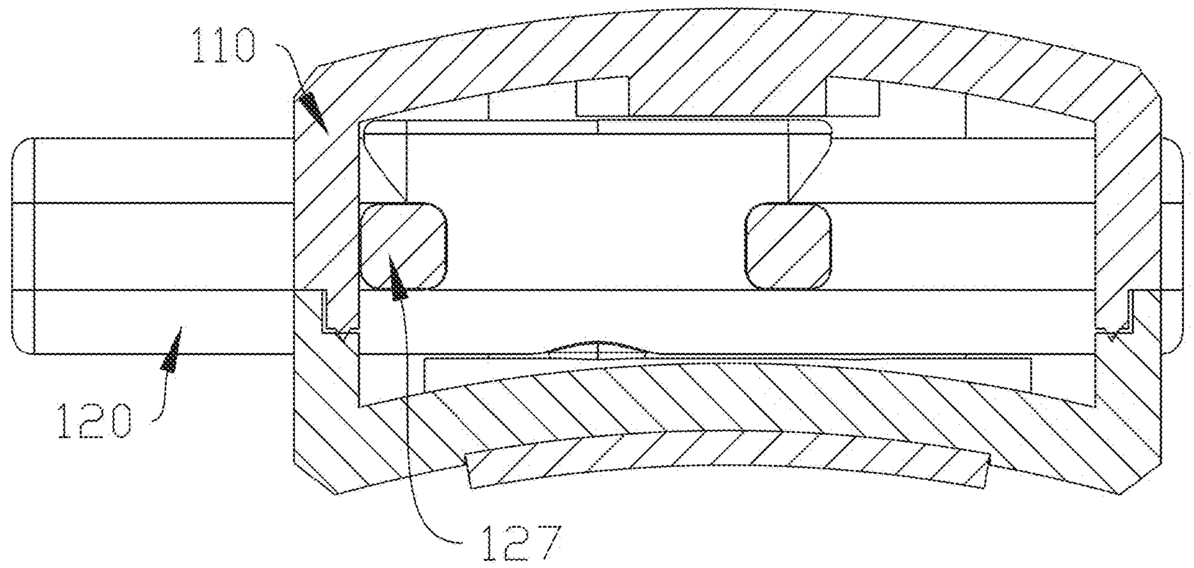
FIG. 13 is a sectional view of a push rod in a second position in a medication reminder device according to some embodiments of the present disclosure.

Specifically, the limiting protrusion 127 may be implemented as two separate small protrusions, as illustrated in FIG. 12 and FIG. 13, which are abutted against the inner walls of the housing 110 on both sides. Alternatively, a single long protrusion may be used to achieve the same effect. The exact shape and configuration of the protrusions are not strictly defined herein, as long as the protrusions ensure that the push rod 120 does not slide out of the housing 110.

It should be finally noted that the above-described embodiments are merely for illustration of the present disclosure, but are not intended to limit the present disclosure. Although the present disclosure is described in detail with reference to these embodiments, a person skilled in the art may also make various modifications to the technical solutions disclosed in the embodiments, or make equivalent replacements to a part of or all technical features contained therein. Such modifications or replacement, made without departing from the principles of the present disclosure, shall fall within the scope of the present disclosure. Especially, various technical features mentioned in various embodiments may be combined in any fashion as long as there is no structural conflict.

What is claimed is:

1. A medication reminder device, comprising:

a housing, configured to be attached to a medication container, wherein an observation window is defined in the housing; and at least one push rod, slidably disposed inside the housing, wherein at least one reminder indicator is arranged on the at least one push rod, and the at least one push rod is configured to slide relative to the housing in response to receiving a force at an end portion of the at least one push rod, to cause the at least one reminder indicator to be exposed through the observation window;

wherein the at least one push rod has a first end and a second end that are opposite to each other, wherein the end portion is the first end; wherein in a case where the at least one reminder indicator is obscured by the housing, the first end protrudes from the housing, and the at least one push rod receives the force via the first end and slides, such that the at least one reminder indicator is exposed through the observation window; or in a case where the at least one reminder indicator is exposed through the observation window, the second end protrudes from the housing, and the at least one push rod receives the force via the second end and slides, such that the at least one reminder indicator is obscured by the housing.

2. The medication reminder device according to claim 1, wherein a first directional indicator is arranged on the first end, and a second directional indicator is arranged on the second end; wherein in a case where the first end protrudes from the housing, the first directional indicator is exposed, and the second directional indicator is positioned inside the housing and obscured by the housing; and in a case where the second end protrudes from the housing, the second directional indicator is exposed, and the first directional indicator is positioned inside the housing and obscured by the housing.

3. The medication reminder device according to claim 1, wherein a plurality of said reminder indicators are arranged; wherein the plurality of said reminder indicators are arrayed on the at least one push rod, and one of the reminder indicators is exposed through the observation window in a case where the at least one push rod slides to different positions relative to the housing.

4. The medication reminder device according to claim 1, wherein the housing comprises a first housing and a second housing; wherein a first notch is defined in an edge of the first housing, and a second notch is defined in an edge of the second housing; wherein the first housing is snap-fitted to the second housing, and the first notch and the second notch together define an opening allowing the at least one push rod to slide thereinside.

5. The medication reminder device according to claim 1, wherein a first engagement portion is arranged on the at least one push rod, and at least two second engagement portions are arranged inside the housing;

wherein the first engagement portion is configured to be engaged with one of the second engagement portions in a case where the at least one reminder indicator is obscured by the housing, and the first engagement portion is further configured to be engaged with another of the two second engagement portions in a case where the at least one reminder indicator is exposed from the observation window.

6. The medication reminder device according to claim 5, wherein the first engagement portion comprises an elastic protrusion, and each of the second engagement portions comprises a slot; wherein the elastic protrusion is configured to elastically contract in response to compression by an inner wall of the housing in a case where the at least one push rod slides, and is configured to be automatically rebound into engagement with the slot in a case where the at least one push rod slides to a designated position.

7. The medication reminder device according to claim 1, wherein the at least one push rod is in a first position in a case where the at least one reminder indicator is obscured by the housing, and the at least one push rod is in a second position in a case where the at least one reminder indicator is exposed through the observation window; and a limiting protrusion is arranged on the at least one push rod; wherein the limiting protrusion is configured to be abutted against an inner wall of a first side of the housing to prevent the at least one push rod from further sliding in a case where the at least one push rod slides from the first position to the second position, and the limiting protrusion is further configured to be abutted against an inner wall of a second side of the housing to prevent the at least one push rod from further sliding in a case where the at least one push rod slides from the second position to the first position, wherein the first side and the second side of the housing are opposite to each other.

8. The medication reminder device according to claim 1, wherein a plurality of said push rods are arranged, wherein the plurality of said push rods are arrayed on the housing.

9. The medication reminder device according to claim 1, wherein a side of the housing is configured to be adhesively attached to the medication container; or a lanyard is arranged on the housing, wherein the lanyard is configured to be attached to the medication container.

10. A medication container, wherein the medication container is equipped with a medication reminder device, wherein the medication reminder device comprises:

a housing, configured to be attached to a medication container, wherein an observation window is defined in the housing; and at least one push rod, slidably disposed inside the housing, wherein at least one reminder indicator is arranged on the at least one push rod, and the at least one push rod is configured to slide relative to the housing in response to receiving a force at an end portion of the at least one push rod, to cause the at least one reminder indicator to be exposed through the observation window;

wherein the at least one push rod has a first end and a second end that are opposite to each other, wherein the end portion is the first end; wherein in a case where the at least one reminder indicator is obscured by the housing, the first end protrudes from the housing, and the at least one push rod receives the force via the first end and slides, such that the at least one reminder indicator is exposed through the observation window; or in a case where the at least one reminder indicator is exposed through the observation window, the second end protrudes from the housing, and the at least one push rod receives the force via the second end and slides, such that the at least one reminder indicator is obscured by the housing.

11. The medication container according to claim 10, wherein a first directional indicator is arranged on the first end, and a second directional indicator is arranged on the second end; wherein in a case where the first end protrudes from the housing, the first directional indicator is exposed, and the second directional indicator is positioned inside the housing and obscured by the housing; and in a case where the second end protrudes from the housing, the second directional indicator is exposed, and the first directional indicator is positioned inside the housing and obscured by the housing.

12. The medication container according to claim 10, wherein a plurality of said reminder indicators are arranged; wherein the plurality of said reminder indicators are arrayed on the at least one push rod, and one of the reminder indicators is exposed through the observation window in a case where the at least one push rod slides to different positions relative to the housing.

13. The medication container according to claim 10, wherein the housing comprises a first housing and a second housing; wherein a first notch is defined in an edge of the first housing, and a second notch is defined in an edge of the second housing; wherein the first housing is snap-fitted to the second housing, and the first notch and the second notch together define an opening allowing the at least one push rod to slide thereinside.

14. The medication container according to claim 10, wherein a first engagement portion is arranged on the at least one push rod, and at least two second engagement portions are arranged inside the housing;

wherein the first engagement portion is configured to be engaged with one of the second engagement portions in a case where the at least one reminder indicator is obscured by the housing, and the first engagement portion is further configured to be engaged with another of the two second engagement portions in a case where the at least one reminder indicator is exposed from the observation window.

15. The medication container according to claim 14, wherein the first engagement portion comprises an elastic protrusion, and each of the second engagement portions comprises a slot; wherein the elastic protrusion is configured to elastically contract in response to compression by an inner wall of the housing in a case where the at least one push rod slides, and is configured to be automatically rebound into engagement with the slot in a case where the at least one push rod slides to a designated position.

16. The medication container according to claim 10, wherein the at least one push rod is in a first position in a case where the at least one reminder indicator is obscured by the housing, and the at least one push rod is in a second position in a case where the at least one reminder indicator is exposed through the observation window; and a limiting protrusion is arranged on the at least one push rod; wherein the limiting protrusion is configured to be abutted against an inner wall of a first side of the housing to prevent the at least one push rod from further sliding in a case where the at least one push rod slides from the first position to the second position, and the limiting protrusion is further configured to be abutted against an inner wall of a second side of the housing to prevent the at least one push rod from further sliding in a case where the at least one push rod slides from the second position to the first position, wherein the first side and the second side of the housing are opposite to each other.

17. The medication container according to claim 10, wherein a plurality of said push rods are arranged, wherein the plurality of said push rods are arrayed on the housing.

18. The medication container according to claim 10, wherein a side of the housing is configured to be adhesively attached to the medication container; or a lanyard is arranged on the housing, wherein the lanyard is configured to be attached to the medication container.

* * * * *